US012567653B2

(12) United States Patent
Kitazawa et al.

(10) Patent No.: US 12,567,653 B2
(45) Date of Patent: Mar. 3, 2026

(54) INSPECTION METHOD, METHOD OF MANUFACTURING SECONDARY BATTERY LAMINATE, AND METHOD OF MANUFACTURING SECONDARY BATTERY

(71) Applicant: ZEON CORPORATION, Tokyo (JP)

(72) Inventors: Yuzo Kitazawa, Tokyo (JP);
Masanobu Sato, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 366 days.

(21) Appl. No.: 17/904,481

(22) PCT Filed: Feb. 17, 2021

(86) PCT No.: PCT/JP2021/006000
§ 371 (c)(1),
(2) Date: Aug. 18, 2022

(87) PCT Pub. No.: WO2021/172143
PCT Pub. Date: Sep. 2, 2021

(65) Prior Publication Data
US 2023/0097190 A1 Mar. 30, 2023

(30) Foreign Application Priority Data
Feb. 27, 2020 (JP) ................................. 2020-032151

(51) Int. Cl.
*H01M 50/46* (2021.01)

(52) U.S. Cl.
CPC ................................. *H01M 50/461* (2021.01)

(58) Field of Classification Search
CPC ............. H01M 50/403; H01M 10/058; H01M 10/0525; H01M 10/04; H01M 10/052;
(Continued)

(56) References Cited

U.S. PATENT DOCUMENTS

| | | | |
|---|---|---|---|
| 2013/0316219 A1* | 11/2013 | Ha | H01M 50/446 |
| | | | 427/596 |
| 2014/0242470 A1* | 8/2014 | Ogata | B32B 7/12 |
| | | | 156/332 |
| 2015/0236322 A1* | 8/2015 | Laramie | H01M 50/423 |
| | | | 429/145 |
| 2017/0113247 A1* | 4/2017 | Wang | H01M 50/403 |

(Continued)

FOREIGN PATENT DOCUMENTS

| | | |
|---|---|---|
| EP | 3352248 A1 | 7/2018 |
| JP | 2012225848 A | 11/2012 |

(Continued)

OTHER PUBLICATIONS

KR101185003B1 translation (Year: 2012).*

(Continued)

*Primary Examiner* — Allison Bourke
*Assistant Examiner* — Travis L. Martin
(74) *Attorney, Agent, or Firm* — KENJA IP LAW PC

(57) ABSTRACT

The present disclosure is directed to a new technique that can sufficiently suppress bonding defects by identifying application defect sites with a high accuracy when manufacturing a secondary battery laminate including battery members which are bonded together via an adhesive material. An inspection method of the present disclosure is an inspection method used upon forming a dry material on at least one bonding surface of an electrode and a separator, through the steps of applying a coating material on the bonding surface and forming the adhesive material by drying the coating material. In this inspection method, prior to the step of forming the adhesive material, the displacement of the bonding surface to which the coating material has been applied is measured by a laser displacement gauge to identify an application defect site.

18 Claims, 2 Drawing Sheets

(58) Field of Classification Search
   CPC ............. H01M 50/46–461; H01M 50/40–489; H01M 4/139; B32B 41/00; B32B 37/1284; B32B 37/14; B32B 37/20; B32B 2457/10; Y02E 60/10; Y02P 70/50; G01B 11/24
   See application file for complete search history.

(56) References Cited

U.S. PATENT DOCUMENTS

| | | | | |
|---|---|---|---|---|
| 2017/0200932 | A1* | 7/2017 | Sasaki | H01M 50/443 |
| 2021/0036375 | A1* | 2/2021 | Sato | H01M 10/058 |
| 2021/0265673 | A1* | 8/2021 | Jordan | H01M 50/105 |

FOREIGN PATENT DOCUMENTS

| | | | |
|---|---|---|---|
| JP | 5383471 | B2 | 1/2014 |
| JP | 2018170281 | A | 11/2018 |
| KR | 101185003 | B1 * | 10/2012 |
| KR | 1020130075672 | A | 7/2013 |
| TW | 201140916 | A | 11/2011 |

OTHER PUBLICATIONS

Apr. 6, 2021, International Search Report issued in the International Patent Application No. PCT/JP2021/006000.

Aug. 30, 2022, International Preliminary Report on Patentability issued in the International Patent Application No. PCT/JP2021/006000.

Jun. 25, 2024, the Extended European Search Report issued by the European Patent Office in the corresponding European Patent Application No. 21760054.3.

Aug. 7, 2025, Communication pursuant to Article 94(3) EPC issued by the European Patent Office in the corresponding European Patent Application No. 21760054.3.

* cited by examiner

61

T

INSPECTION METHOD, METHOD OF MANUFACTURING SECONDARY BATTERY LAMINATE, AND METHOD OF MANUFACTURING SECONDARY BATTERY

TECHNICAL FIELD

The present disclosure relates to a method of inspecting a coating defect of an adhesive material on a surface of a battery member, and methods of manufacturing a secondary battery laminate and a secondary battery through the inspection.

BACKGROUND

Secondary batteries such as lithium ion secondary batteries have characteristics such as compact size, light weight, high energy-density, and the ability to be repeatedly charged and discharged, and are used in a wide range of applications. A secondary battery normally includes battery components such as a positive electrode, a negative electrode, and a separator that separates the positive electrode and the negative electrode, and prevents short-circuiting between the positive electrode and the negative electrode.

In a manufacturing process of a secondary battery, before electrodes and separators are immersed into an electrolyte solution, they may be pressure bonded to obtain a laminate (hereinafter, also referred to as a "secondary battery laminate"), which may then be cut into a desired size and/or laminated, folded, or wound, if necessary. During such cutting, lamination, folding, or winding, the electrodes and the separators may be misaligned, leading to problems such as defects and a reduction in productivity.

Accordingly, in recent years, technique for favorably bonding battery members together by using a battery member having an adhesive material containing a binder on its surface have been investigated. For example, in PTL 1, a separator provided with an adhesive material on the surface thereof is produced, wherein a coating material containing a certain thermoplastic polymer is applied to the separator, and the coated film is dried to remove a solvent in the coating liquid.

CITATION LIST

Patent Literature

PTL 1: JP 2018-170281 A

SUMMARY

Technical Problem

Here, when battery members are bonded together via an adhesive material, there may be sites without the adhesive material (application defect sites) due to unintentional coating defects. In order to identify such application defect sites to suppress a bonding defect between battery members, a bonding surface on which an adhesive material has been formed by drying may be inspected by a CCD camera or the like before bonding.

The above-mentioned conventional inspection method, however, needs to identify application defect sites with a high accuracy. Particularly, in recent years, in order to lower the internal resistance of a secondary battery to improve the battery characteristics, an attempt has been made to reduce the amount of adhesive materials which may serve as resistive components. However, researches made by the present inventors have revealed that that identification of application defect sites by the above-mentioned conventional inspection method is difficult for various reasons. For example, when the amount of a coating material used is reduced for the purpose of reducing the adhesive material formed, the roughness of the bonding surface hinders detection of the adhesive material formed after drying.

It would be therefore helpful to provide a new technique that can sufficiently suppress bonding defects by identifying application defect sites with a high accuracy when manufacturing a secondary battery laminate including battery members which are bonded together via an adhesive material.

Solution to Problem

The present inventors conducted extensive studies to solve the aforementioned problem. The present inventors has paid attentions on a coating material applied to a bonding surface before being dried, rather than an adhesive material formed after being dried, which is the target of the conventional inspection, in the manufacturing process of a laminate in which the battery members are bonded together via the adhesive material. Then, the present inventors newly found that the accuracy of identification of application defect sites can be improved by using a laser displacement gauge to measure the displacement of the bonding surface to which the coating material has been applied before it is dried, thereby completing the present disclosure.

Namely, the present disclosure is directed to advantageously solving the above-mentioned problem, and an inspection method of the present disclosure is an inspection method used when forming an adhesive material to a bonding surface of at least one of an electrode and an separator through the steps of applying a coating material containing a binder and a solvent to the bonding surface; and forming the adhesive material by drying the coating material which has been applied to the bonding surface, the method comprising the step of: prior to the step of forming the adhesive material, measuring a displacement of the bonding surface to which the coating material has been applied with a laser displacement gauge to identify an application defect site.

Before drying, the displacement (height) of the coating material from the bonding surface tends to be greater as compared with the adhesive material formed after drying due to removal of the solvent during the drying. Therefore, by measuring the displacement of the bonding surface on which the coating material has been applied by the laser displacement gauge before drying, the difference in the displacements between applied sites and application defect sites becomes distinct, which makes application defect sites to be identified with a high accuracy. In other words, with such an inspection, if a large number of application defect sites are identified, an immediate countermeasure can be taken, such as immediately stopping the production line, identifying the cause of the application defect sites (clogging of application nozzles or the like), and removing the cause. As a result, the occurrence ratio of bonding defects of the electrode and the separator can be reduced.

Further, in the inspection method of the present disclosure, preferably, an average height of the coating material from the bonding surface in the step of applying the coating material is 2 μm or more and 150 μm or less. When the average height of the coating material applied to the bonding surface is within the above range, the difference between the displacements of applied sites and application defect sites becomes more distinct, which leads to an increase in the accuracy of identification of application defect sites. Further, the efficiency of drying of the coating material can be increased.

In the present disclosure, the "average height of the coating material from the bonding surface" of the coating material can be calculated as the average value of the heights of arbitrary-selected 1000 sites of the coating material measured by a laser displacement gauge or the like.

Here, in the inspection method of the present disclosure, preferably, the adhesive material is formed into a dot shape, and an average diameter of the dot-shaped adhesive material is 5 μm or more and 300 μm or less, in the step of forming the adhesive material. When the average diameter of the dot-shaped adhesive material applied to the bonding surface is within the above range, the electrode and the separator can be favorably bonded together.

In the present disclosure, the "average diameter of the dot-shaped adhesive material" may be the average of the maximum diameters of arbitrary-selected 1000 dots (the maximum length among the lengths of line segments connecting two points on the outer edge of each dot) in a plan view image of the bonding surface under observation by a laser microscope or the like.

Further, in the inspection method of the present disclosure, preferably, a solid content concentration of the coating material is 20% by mass or less in the step of applying the coating material. A coating material having a solid content concentration of 20% by mass or less has excellent handleability without causing excessive increase in the viscosity. As a result, occurrence of application defect sites can be sufficiently suppressed, and the occurrence ratio of bonding defects of the electrode and the separator can be reduced.

Here, in the inspection method of the present disclosure, preferably, the coating is performed by ink jetting in the step of applying the coating material. The ink jetting is excellent in the degree of freedom of the shape (application shape) of the coating material applied, and the productivity of the laminate can be sufficiently secured when the coating material is applied by ink jetting.

In addition, the present disclosure is further directed to advantageously solving the above-mentioned problem, and a method of manufacturing a secondary battery laminate of the present disclosure is a method of manufacturing a secondary battery laminate comprising an electrode and a separator which are bonded together, the method comprising the steps of: conducting an inspection in accordance with any one of the above-described inspection methods; and after conducting the inspection, bonding the electrode and the separator together via the bonding surface on which the adhesive material has been formed. When the inspection is conducted in accordance with the above-described inspection method, if a large number of application defect sites are identified, an immediate countermeasure can be taken, such as immediately stopping the production line to solve the problem. As a result, the occurrence ratio of bonding defects of the electrode and the separator can be reduced, and a laminate can be manufactured efficiently.

In addition, the present disclosure is directed to advantageously solving the above-mentioned problem, and a method of manufacturing a secondary battery of the present disclosure is a method of manufacturing a secondary battery comprising a secondary battery laminate comprising an electrode and a separator that are bonded together, the method comprising the steps of: manufacturing the secondary battery laminate using the above-described method of manufacturing a secondary battery laminate; and assembling the secondary battery using the secondary battery laminate and an electrolyte solution. In the laminate manufactured in accordance with the method of manufacturing the laminate described above, the occurrence ratio of bonding defects of the electrode and the separator is reduced. Accordingly, by using the laminate, secondary batteries having excellent battery characteristics can be efficiently manufactured.

Advantageous Effect

According to the inspection method of the present disclosure, application defect sites can be identified with a high accuracy when manufacturing a secondary battery laminate in which the battery members are bonded together via an adhesive material.

Further, according to the manufacturing method of a secondary battery laminate of the present disclosure, the occurrence ratio of bonding defects of the electrode and the separator can be reduced and a secondary battery laminate can be efficiently manufactured.

Further, according to the method of manufacturing a secondary battery of the present disclosure, secondary batteries having excellent battery characteristics can be efficiently manufactured.

DETAILED DESCRIPTION

Figure 1:
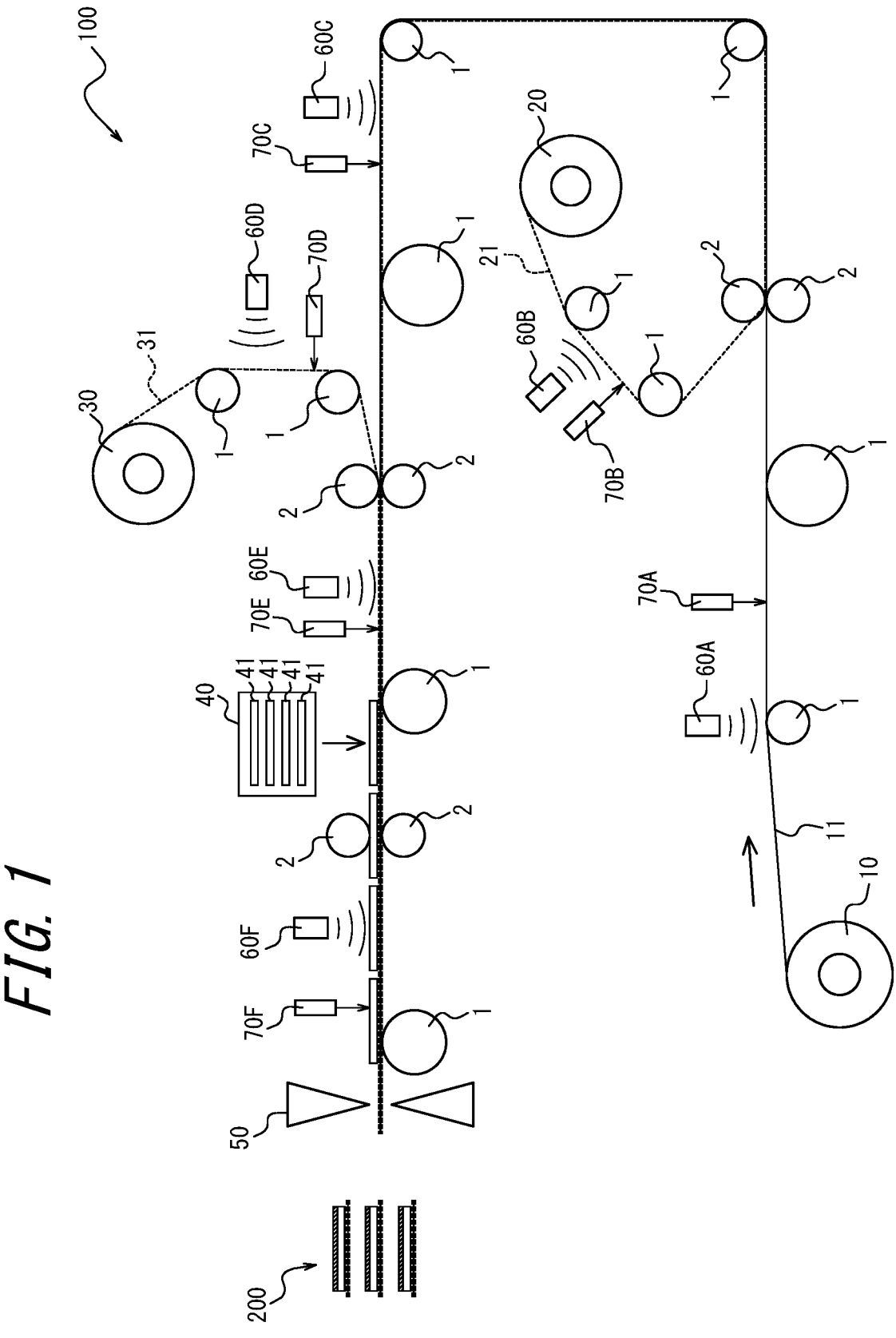
FIG. 1 is an illustrative diagram illustrating a schematic configuration of one example of a manufacturing apparatus of a secondary battery laminate.

An embodiment of the present disclosure will be described below.

Here, an inspection method of the present disclosure can be used to identify application defect sites on a bonding surface of an electrode (positive electrode and/or negative electrode) and/or a separator when the electrode and the separator are bonded together to manufacture a secondary battery laminate.

Further, a method of manufacturing a secondary battery laminate of the present disclosure is a method of manufacturing a secondary battery laminate through the inspection according to the inspection method of the present disclosure described above, and can be particularly suitably used upon continuous manufacturing of secondary battery laminates.

Further, a method of manufacturing a secondary battery of the present disclosure can be used for producing a secondary battery such as a non-aqueous secondary battery (e.g., a lithium ion secondary battery) using a secondary battery laminate manufactured in accordance with the method of manufacturing a secondary battery laminate of the present disclosure described above.

(Inspection Method)

As described above, the inspection method of the present disclosure is used in a process of manufacturing a secondary battery laminate. Specifically, in the manufacturing process of the secondary battery laminate wherein the inspection method of the present disclosure is implemented includes at least:

a step of applying a coating material containing a binder and a solvent to at least one bonding surface of an electrode and a separator (application step);

a step of, after the application step, identifying an application defect site by measuring the displacement of the bonding surface on which the coating material has been applied by a laser displacement gauge (inspection step);

a step of, after the inspection step, forming an adhesive material by drying the coating material which have been applied to the bonding surface (drying step); and a step of, after the drying step, bonding the electrode and the separator together via the bonding surface on which the adhesive material has been formed (bonding step).

In the manufacturing process of a laminate in which the application step, the drying step, and the bonding step are performed, by performing the inspection step of measuring the displacement of the bonding surface by the laser displacement gauge prior to the drying step, application defect sites can be identified with a high accuracy. As a result, the occurrence of bonding defects of the electrode and the separator can be reduced, and laminates can be manufactured efficiently.

Further, according to such a manufacturing process, it is possible to manufacture a laminate by in-line production in which the application step, the inspection step, the drying step, and the bonding step are performed in a single line. As a result, problems such as falling off or blocking of the adhesive material caused by winding and slitting for transferring battery members in conventional manufacturing processes do not occur.

<Secondary Battery Laminate>

A laminate is obtained by bonding the electrode and the separator together via the bonding surface. Here, the electrode that is bonded to the separator for constituting the secondary battery laminate may be a positive electrode only, a negative electrode only, or both a positive electrode and a negative electrode. Further, in the case where both a positive electrode and a negative electrode are bonded to a separator to form a laminate, the number of the positive electrode, the negative electrode, and the separator included in the laminate may be one or two or more.

In other words, the structure of the laminate may be any of the following (1) to (6):

(1) positive electrode/separator;

(2) negative electrode/separator;

(3) positive electrode/separator/negative electrode;

(4) positive electrode/separator/negative electrode/separator;

(5) separator/positive electrode/separator/negative electrode; or (6) structure in which positive electrodes and negative electrodes are laminated alternately having separators interposed therebetween (for example, "separator/negative electrode/separator/positive electrode/separator/negative electrode . . . /separator/positive electrode", etc.).

Note that a laminate having a plurality of electrodes and/or separators can be manufactured by repeatedly performing the above-described application step, the inspection step, the drying step, and the bonding step, for example.

<Electrode>

Here, the electrode is not particularly limited, and can be an electrode made of an electrode substrate including an electrode mixed material layer formed on one side or both sides of a current collector, or an electrode further including a porous membrane layer formed on the electrode mixed material layer of the electrode substrate, for example.

The current collector, the electrode mixed material layer, and the porous membrane layer are not particularly limited, and can be any current collector, electrode mixed material layer, and porous membrane layer that can be used in the field of secondary batteries, such as those described in JP 2013-145763 A, for example. Here, the porous membrane layer is a layer containing non-conductive particles such as the ones described in JP 2013-145763 A, for example.

The electrode used for manufacturing the laminate may be wound into a roll shape or may be cut in advance.

Further, the thickness of the electrode is not particularly limited, but is preferably 30 μm or more and 250 μm or less.

<Separator>

The separator is not particularly limited, and can be a separator formed of a separator substrate or a separator including a porous membrane layer formed on one side or both sides of a separator substrate, for example.

The separator substrate and the porous membrane layer are not particularly limited, and any separator substrate and porous membrane layer that can be used in the field of secondary batteries, such as those described in, for example, JP 2012-204303 A and JP 2013-145763 A, can be used.

The separator used for manufacturing the laminate may be wound into a roll shape or may be cut in advance. A separator that is wound into a roll shape is preferably used from a viewpoint that continuous production of secondary battery laminates can be performed efficiently.

Here, the thickness of the separator is not particularly limited, but is preferably 1 μm or more and 30 μm or less.

<Application Step>

In the application step, a coating material is applied to the bonding surface(s) of the electrode and/or the separator.

<<Coating Material>>

The coating material is a component capable of forming an adhesive material after being dried on the bonding surface. The coating material includes a binder and a solvent, and optionally includes components such as non-conductive particles other than the binder and the solvent.

[Binder]

The binder that is used may be any binder used in the field of secondary batteries without any particular limitation as long as it is capable of bonding the electrode and the separator together and does not inhibit the battery reaction. Of these, from the viewpoint of favorably bonding the electrode and the separator together, a binder made of a polymer is preferably used as the binder. Note that the binder may include one type of polymer, or may include two or more types of polymers.

Examples of polymers that can be used as the binder include, but are not particularly limited to, fluoropolymers such as polyvinylidene fluoride and polyvinylidene fluoride-hexafluoropropylene (PVdF-HFP) copolymer; conjugated diene polymers such as styrene-butadiene copolymer (SBR) and acrylonitrile-butadiene copolymer (NBR); hydrogenated products of conjugated diene polymers; polymers including a (meth)acrylic acid alkyl ester monomer unit (acrylic polymers); and polyvinyl alcohol-based polymers such as polyvinyl alcohol (PVA).

In the present disclosure, "(meth)acrylic acid" refers to acrylic acid and/or methacrylic acid.

The form of the binder made of a polymer is not particularly limited, and may be a particulate form, a non-particulate form, or a combination of a particulate form and a non-particulate form.

Note that, in the case where the binder made of a polymer is in a particulate form, the particulate binder may be particles having a single phase structure made of a single polymer, or may be particles having a heterophase structure in which two or more polymers different from each other are physically or chemically bonded. Specific examples of heterophase structures include a core-shell structure in which a center portion (core) and an outer shell (shell) of spherical particles are formed from different polymers; and a side-by-side structure in which two or more polymers are disposed so as to be adjacent to each other. Note that the term "core-shell structure" as used in the present disclosure includes a structure in which a shell completely covers the core outer surface, as well as a structure in which a shell partially covers the core outer surface. Further, in the present disclosure, even when the core outer surface seems to be completely covered by a shell by its appearance, the shell is considered to be a shell that partially covers the core outer surface if the shell has a pore that communicates between inside and outside of the shell.

Further, in the case where the binder made of a polymer is in a particulate form, the particulate binder preferably has a volume average particle diameter of 0.1 μm or more, more preferably 0.15 μm or more, even more preferably 0.18 μm or more, and is preferably 10 μm or less, more preferably 8 μm or less, even more preferably 6 μm or less. When the volume average particle diameter of the particulate binder is 0.1 μm or more, the adhesive force between the electrode and the separator can be increased. Further, when the volume average particle diameter of the binder of the particulate is 10 μm or less, the energy density of the secondary battery produced using the laminate can be increased.

In this disclosure, "volume average particle diameter" refers to a particle diameter at which, in a particle diameter distribution on the volume basis measured by laser diffraction, cumulative volume calculated from a small diameter end of the distribution reaches 50%.

Further, when the particulate binder includes a polymer having a core-shell structure, the volume average particle diameter of the polymer having the core-shell structure is preferably 0.1 μm or more, more preferably 0.15 μm or more, even more preferably 0.2 μm or more, and is preferably 8 μm or less, more preferably 6 μm or less, and even more preferably 4 μm or less. When the volume average particle diameter of the binder made of a polymer having a core-shell structure is 0.1 μm or more, the adhesive force between the electrode and the separator can be increased. Further, when the volume average particle diameter of the binder made of the polymer having the core-shell structure is 8 μm or less, the energy density of a secondary battery produced using the laminate can be increased.

In addition, in the case where the particulate binder includes a polymer having a core-shell structure, the diameter of the core of the polymer having the core-shell structure is preferably 5% or more and less than 100%, more preferably 10% or more and less than 100%, and even more preferably 20% or more and less than 100%, with respect to 100% of the volume average particle diameter of the polymer having the core-shell structure. When the diameter of the core is equal to or larger than any of the above lower limits, the particles can favorably maintain their shapes even after being fed to the bonding surface and dried, and the electrode and the separator can be favorably bonded together.

Further, in the case where the binder is made of a polymer, the polymer constituting the binder preferably contains a low Tg polymer having a glass transition temperature of 25° C. or lower. When the polymer constituting the binder contains a low Tg polymer, the adhesive force between the electrode and the separator can be increased. Note that the glass transition temperature of the low Tg polymer is preferably −120° C. or higher.

Here, in the present disclosure, the glass transition temperature can be measured by the following procedure using a differential scanning calorimeter.

First, a DSC curve was measured on a differential scanning calorimeter (product name "EXSTAR DSC6220" from SII NanoTechnology Inc.) at standard temperature and standard humidity in the measurement temperature range of −120° C. to 200° C. at a heating rate of 10° C./min, where 10 mg of a polymer which is a dried sample specimen is weighed into an aluminum pan, and an empty aluminum pan was used as a reference. The glass transition temperature can be determined from an intersection point of a base line directly before a heat absorption peak on the DSC curve at which a derivative signal (DDSC) is at least 0.05 mW/minute/mg in a heating process and a tangent to the DSC curve at a first inflection point to appear after the heat absorption peak.

Note that, in the case where the polymer has a core-shell structure to be described later, and a polymer of a core or a polymer of a shell is used as a measurement specimen, a monomer composition used for preparing the polymer being the polymer of the core or the polymer of the shell is used as the measurement specimen. A water dispersion containing that polymer is prepared under the same polymerization conditions as those of the polymer, and the water dispersion is then dried, to thereby obtain the polymer as the measurement specimen.

In the case where the binder includes a polymer having a core-shell structure, the glass transition temperature of the shell is preferably higher than that of the core in the polymer having the core-shell structure. When the glass transition temperature of the shell is higher than the glass transition temperature of the core, fusion between the particulate polymers after bonding of battery members can be prevented and an increase in the resistance can be suppressed.

The glass transition temperature of the core of the polymer having the core-shell structure is preferably −40° C. or higher and 200° C. or lower, more preferably −40° C. or higher and 100° C. or lower, and even more preferably −40° C. or higher and 70° C. or lower. When the glass transition temperature of the core is −40° C. or higher, battery members can be bonded together via the adhesive material further firmly. Further, when the glass transition temperature of the core is 100° C. or lower, the polymerization stability of the particulate polymer can be ensured.

Further, the glass transition temperature of the shell of the polymer having a core-shell structure is preferably 10° C. or higher, more preferably 20° C. or higher, even more preferably 30° C. or higher, and is preferably 130° C. or lower, more preferably 120° C. or lower. When the glass transition temperature of the shell is 10° C. or higher, the particles can maintain their shapes favorably even after being supplied to the bonding surface. Moreover, when the glass transition temperature of the shell is 130° C. or lower, the electrode and the separator can be favorably bonded together.

The polymer having the core-shell structure preferably has at least one glass transition temperature of 25° C. or lower.

[Solvent]

The solvent is not particularly limited, and water, organic solvents, and mixtures thereof can be used, for example. Examples of organic include, but are not specifically limited to, alicyclic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; nitriles such as acetonitrile and propionitrile; ethers such as tetrahydrofuran and ethylene glycol diethyl ether; and alcohols such as methanol, ethanol, isopropanol, ethylene glycol, and ethylene glycol monomethyl ether.

Of these, water and alcohols are preferred and water is more preferred as the solvent from the viewpoint of efficiently producing the laminate for a secondary.

[Non-Conductive Particles]

The non-conductive particles which may be optionally contained in the coating material are particles which are not dissolved to and can maintain their shapes in the solvent of the coating material and the electrolytic solution of a secondary battery. Usage of a coating material containing non-conductive particles in addition to the binder and solvent described above enables the non-conductive particles to be included in the adhesive material formed after drying. Such non-conductive particles can contribute to improvement in the heat shrinkage resistance of the laminate and prevention of short circuit in a secondary battery.

Various types of inorganic fine particles and organic fine particles can for example be used as the non-conductive particles.

Specifically, although both inorganic fine particles and organic fine particles made of a polymer other than the above-described binder can be used as the non-conductive particles, inorganic fine particles are normally used. Among materials of non-conductive particles, such materials that are present stably in the use environment of secondary batteries and have electrochemical stability are preferred. Examples of non-conductive particles that are preferable from this viewpoint include particles of oxides such as aluminum oxide (alumina), hydrated aluminum oxide (boehmite ($AlOOH$)), gibbsite ($Al(OH)_3$), silicon oxide, magnesium oxide (magnesia), calcium oxide, titanium oxide (titania), barium titanate ($BaTiO_3$), ZrO, and alumina-silica composite oxide; particles of nitrides such as aluminum nitride and boron nitride; particles of covalent crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, or the like as necessary. Of these particles, barium sulfate particles and alumina particles are preferable as the non-conductive particles.

The non-conductive particles may be used alone or in combination.

Further, the volume average particle diameter of the non-conductive particles is not particularly limited, but is preferably 0.1 μm or more and 2.0 μm or less. Additionally, the amount of the non-conductive particles used is not particularly limited, and can be appropriately determined within the range of the usual usage amount.

[Properties of Coating Material]

The coating material preferably has a solid content concentration of 50% by mass or less, more preferably 40% by mass or less, even more preferably 20% by mass or less, still even more preferably 15% by mass or less, and particularly preferably 10% by mass or less. When the solid content concentration is 50% by mass or less, the coating material can have a sufficient average height on the bonding surface, which makes detection by a laser displacement gauge becomes easy. Further, a coating material having a solid content concentration of 20% by mass or less is excellent in handleability without causing excessive increase in the viscosity. As a result, occurrence of application defect sites can be sufficiently suppressed, and the occurrence ratio of bonding defects of the electrode and the separator can be reduced.

Note that, although the lower limit of the solid content concentration of the coating material is not particularly limited, the solid content concentration is preferably 1% by mass or more, and more preferably 5% by mass or more from the viewpoint of ensuring drying efficiency.

Further, the coating material has a viscosity of preferably 1 mPa·s or more and 50 mPa·s or less, more preferably 1 mPa·s or more and 40 mPa·s or less, and even more preferably 1 mPa·s or more and 30 mPa·s or less. A coating material having a viscosity within any of the above ranges is excellent in handleability. As a result, occurrence of application defect sites can be sufficiently suppressed, and the occurrence ratio of bonding defects of the electrode and the separator can be reduced.

In the present disclosure, a "viscosity" may be measured in accordance with JIS Z8803. In particular, a value of "viscosity" may be a value of viscosity at a temperature of 25° C. measured using a coaxial double cylinder rotary viscometer.

<<Application Method>>

Application of the coating material on the bonding surface is not particularly limited, and may be performed using methods such as ink jetting, spraying, the dispenser method, gravure coating, and screen printing. Of these, from the viewpoint of the productivity and a high degree of freedom of shape formation, the application method is preferably ink jetting.

The coating material may be applied to the entire surface of the bonding surface, or may be applied to only a part of the bonding surface. In the case where the coating material is applied to only a part of the bonding surface, the coating material may be applied in any shape in plan view such as, but is not particularly limited to, a stripe shape, a dot shape, or a lattice shape. Of these, from the viewpoint of enhancing the liquid injection property of the electrolytic solution when a secondary battery is manufactured using the laminate, the coating material is preferably applied into a dot shape. The dot-shaped coating material may be uniformly disposed (applied) on the entire surface of the bonding surface, or may be disposed (applied) in a certain pattern such as a stripe shape, a dot shape, a grid shape, or the like. In the case where the coating material in a tiny dot shape is arranged in a predetermined pattern, the coating material is preferably applied into the desired pattern by ink jetting from the viewpoint of ease of formation and arrangement of the coating material.

The average height of the coating material applied to the bonding surface is preferably 2 μm or more, and is preferably 150 μm or less, and more preferably 125 μm or less. When the average height of the coating material is 2 μm or more, the difference between the displacements of applied sites and application defect sites becomes more distinct. As a result, the accuracy of identification of application defect sites can be increased. On the other hand, when the average height of the coating material is 150 μm or less, the drying efficiency of the coating material in the drying step to be described later can be increased.

Note that, in the electrode and/or the separator, the surface roughness Sa of the bonding surface to be coated with the coating material is not particularly limited. In the case of the electrode, the surface roughness is preferably 0.2 μm or more and 1.0 μm or less. In the case of the separator, the surface roughness is preferably 0.1 μm or more and 1.0 μm or less. According to the inspection method of the present disclosure to use the laser displacement gauge for inspecting the bonding surface before drying to which the coating material containing the solvent has been applied, the accuracy of identification of application defect sites can be sufficiently ensured even when the bonding surface has the surface roughness Sa within the above range.

In the present embodiment, the "surface roughness Sa" of the bonding surface can be calculated by measuring 10 arbitrarily-selected 100 μm-square regions on the bonding surface under a laser displacement gauge microscope (model: VK-X1000, manufactured by Keyence Corporation).

<Inspection Step>

In the inspection step, the displacement of the bonding surface to which the coating material has been applied in the application step is measured by a laser displacement gauge to identify application defect sites.

Here, the laser displacement gauge is not particularly limited, and a known laser displacement gauge can be used as long as it is an inspection apparatus capable of measuring the displacement of the measurement surface with a laser beam in a non-contact manner. When a laser displacement gauge is used as the inspection apparatus, the displacement of the bonding surface can be measured accurately. An laser displacement gauge is also advantageous in that detection can be made even in the case where the coating material is a dilute liquid having high light transmittance.

In the inspection step, identification of (the number, the locations, or the like) of application defect sites can be made from data of the displacement of the bonding surface measured by the laser displacement gauge.

For example, in the case where the coating material is applied in a desired dot pattern on the bonding surface in the application step described above, it is possible to easily perform identification such as identification of the number of application defect sites by comparing the actually formed pattern identified from the data of displacement measured by the laser displacement gauge, with the desired pattern, during a continuous (inline) manufacturing process of laminates.

Here, if a large number of application defect sites are identified exceeding a predetermined threshold value, for example, an immediate countermeasure can be taken, such as immediately stopping the production line to solve the problem. Because such a countermeasure can be immediately taken, the occurrence ratio of bonding defects of the electrode and the separator can be accordingly reduced.

Note that the measurement conditions (inspection conditions) by the laser displacement gauge can be appropriately set according to the materials of the battery member having the bonding surface and the properties of the coating material on the bonding surface.

<Drying Step>

After the above inspection step, the coating material applied on the bonding surface is dried to form an adhesive material in the drying step.

The drying is not particularly limited, and can be performed using a heating device such as a heater, a dryer, or a heat roller. Note that the temperature upon drying of the electrode and/or the separator to which the coating material has been applied is not particularly limited, and is preferably set to 0° C. or higher, more preferably set to 10° C. or higher, even more preferably set to 15° C. or higher, and is preferably set to 200° C. or lower, more preferably set to 150° C. or lower, and even more preferably set to 100° C. or lower. When the temperature upon drying is 10° C. or higher, the drying speed can be sufficiently increased and laminates can be efficiently manufactured. Further, when the temperature upon drying is set to 200° C. or lower, the shape of the adhesive material formed by drying the coating material becomes good, and the electrode and the separator can be favorably bonded together.

Here, the adhesive material formed by drying the coating material is preferably has a dot shape. The average diameter of the adhesive material having a dot shape is preferably 5 μm or more, and is preferably 300 μm or less, and more preferably 250 μm or less. When the average diameter of the dot-shaped adhesive material formed on the bonding surface is within the above range, the electrode and the separator can be favorably bonded together.

The amount of the adhesive material formed on the bonding surface is preferably 0.01 g/m$^2$ or more and 100 g/m$^2$ or less, more preferably 0.01 g/m$^2$ or more and 50 g/m$^2$ or less, even more preferably 0.01 g/m$^2$ or more and 10 g/m$^2$ or less, and particularly preferably 0.01 g/m$^2$ or more and 1 g/m$^2$ or less. When the amount of the bonding material formed is 0.01 g/m$^2$ or more, the electrode and the separators can be sufficiently bonded together. Further, when the amount of the adhesive material formed is 100 g/m$^2$ or less, laminates can be efficiently manufactured.

The cross-sectional shape of the adhesive material can be a protruding shape, a protruding/recessed shape, or a recessed shape without any specific limitations, and is preferably a protruding/recessed shape from the viewpoint of achieving even better adhesion between the electrode and the separator. Note that the cross-sectional shape of the adhesive material can be modified, for example, by adjusting the drying condition when an adhesive material is formed by drying the coating material.

Here, when the adhesive material is formed at one or more sites, preferably at two or more sites on the bonding surface, the area of the adhesive material formed on the bonding surface per site is preferably 15 μm$^2$ or more, more preferably 25 μm$^2$ or more, even more preferably 50 μm$^2$ or more, and is more preferably 150000 μm$^2$ or less, more preferably 100000 μm$^2$ or less, and even more preferably 80000 μm$^2$ or less. When the area of the bonding material per site is equal to or more than 15 μm$^2$, the electrode and the separator can be sufficiently bonded together. In addition, when the area of the adhesive material per site is equal to or less than 150000 μm$^2$, laminates can be efficiently manufactured.

The above-mentioned formation area can be adjusted by changing the amount, shape, and range of application of the coating material to the bonding surface. Specifically, the formation area can be adjusted, for example, by changing the discharge gradation of the coating material (the number of times to discharge the coating material to the same point) from a nozzle of an ink jet head when the coating material is applied to the bonding surface by ink jetting.

<Bonding Step>

After the drying step, in the bonding step, the electrode and the separator are bonded together via the bonding surface on which the adhesive material has been formed. Here, the bonding can be performed, but is not particularly limited to, through pressing and/or heating of the laminate of the electrode and the separator overlapped having the bonding surface interposed therebetween, for example.

Note that the pressure applied to the laminate, the temperature at which the electrode and the separator are bonded together, and the time for pressing and/or heating the laminate in the bonding step can be appropriately adjusted according to the type and amount of the bonding material used.

13

(Method of Manufacturing Secondary Battery Laminate)

The method of manufacturing a secondary battery laminate of the present disclosure is a method of manufacturing a secondary battery laminate in which an electrode and a separator are bonded together, and includes a step of performing an inspection according to the inspection method of the present disclosure described above.

Specifically, one aspect of the method of manufacturing a secondary battery laminate of the present disclosure includes at least the application step, the inspection step, the drying step, and the bonding step described above in the "Inspection method" section. By using the method of manufacturing a secondary battery laminate of the present disclosure, application defect sites can be identified with a high accuracy in the inspection step, and if a large amount of application defect sites are identified, an immediate countermeasure can be taken, such as immediately stopping the production line to solve the problem. As a result, by using the method of manufacturing a secondary battery laminate of the present disclosure, the ratio of occurrences of bonding defects of the electrode and the separator is reduced and secondary battery laminates can be efficiently produced.

(One Example of Manufacturing Apparatus for Manufacturing Secondary Battery Laminate)

Manufacturing of a secondary battery laminate using the inspection method of the present disclosure and the manufacturing method of a secondary battery laminate of the present disclosure is not particularly limited, and can be performed using, for example, a manufacturing apparatus 100 as illustrated in FIG. 1.

Here, the manufacturing apparatus 100 illustrated in FIG. 1 is an apparatus for manufacturing a laminate 200 for a secondary battery formed by laminating electrodes (positive electrode and negative electrode) and separators in the order of "positive electrode/separator/negative electrode/separator" from the top to the bottom. Note that in this production apparatus 100, a produced laminate 200 for a secondary battery is cut into an appropriate size and is then further stacked before being used in manufacturing of a secondary battery.

The manufacturing apparatus 100 includes a negative electrode roll 10 which is a roll of a wound negative electrode 11, a first separator roll 20 and the second separator roll 30 which are rolls of would separators 21 and 31, respectively, a positive electrode stocker 40 accommodating positive electrodes 41 which have been cut in advance. Further, the manufacturing apparatus 100 includes a plurality of (11 in the illustrated example) conveyance rollers 1, a plurality of (three sets in the illustrated example) press rollers 2, a plurality of (six in the illustrated example) applicators 60A, 60B, 60C, 60D, 60E, and 60F, and a plurality of (six in the illustrated example) laser displacement gauges 70A, 70B, 70C, 70D, 70E, and 70F, and a cutter 50.

Figure 2:
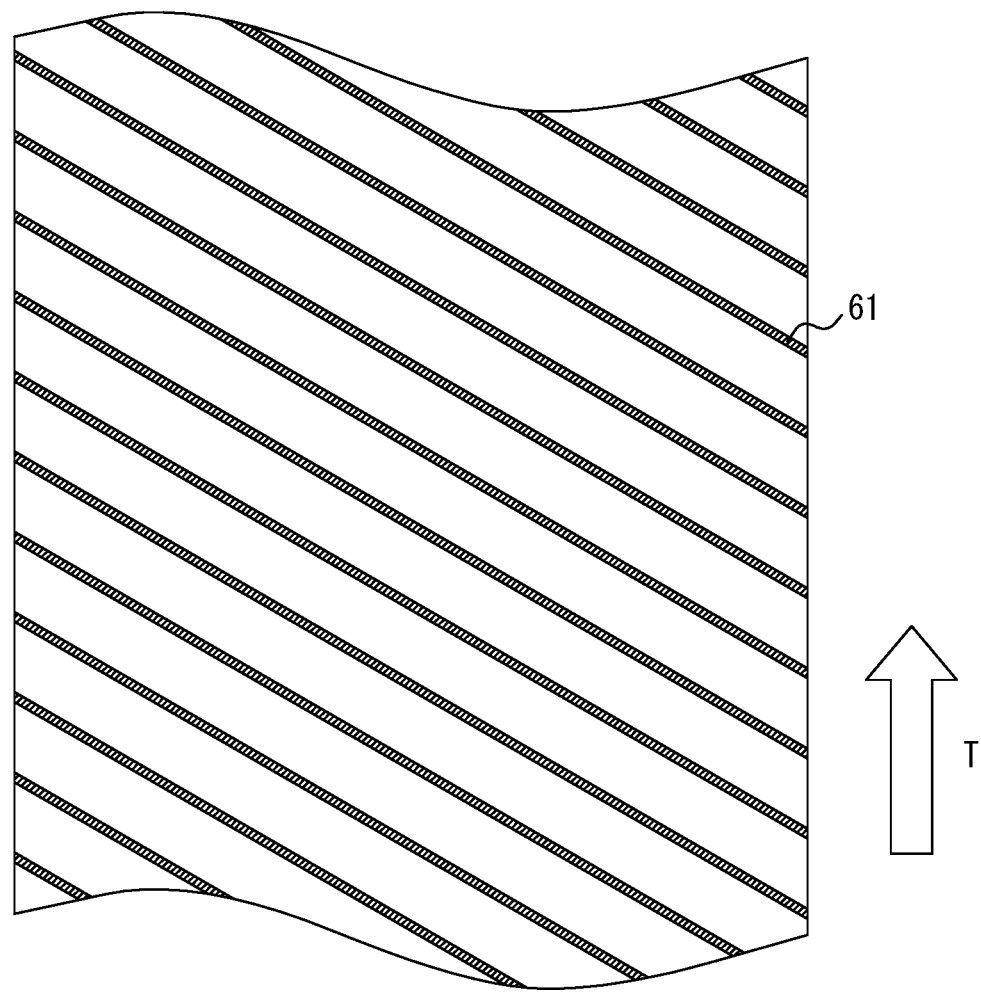
FIG. 2 is a plan view illustrating one example of an application pattern of the coating material.

In the manufacturing machine 100, first, the negative electrode 11 is fed out from the negative electrode roll 10 and conveyed via the conveyance roller 1, and a coating material 61 is fed from the applicator 60A to the bonding surface of the negative electrode 11 so that an oblique stripe application pattern as illustrated in FIG. 2, for example, is formed (application step). Then, the displacement of the bonding surface of the negative electrode 11 to which the coating material 61 has been applied is measured by the laser displacement gauge 70A, and the number of application defect sites on the bonding surface is identified. For example, when the number of application defect sites exceeds a predetermined threshold value, an immediate countermeasure can be taken, such as immediately stopping the production line to solve the problem (hereinafter, the same applies to the "inspection step"). Then, the negative electrode 11 which has been inspected by the laser displacement gauge 70A is heated by the conveyance roller 1 serving as a heat roller disposed between the laser displacement gauge 70A and the press rollers 2. The coating material 61 is dried by this heating, whereby an adhesive material is formed on the bonding surface of the negative electrode 11 (drying step) Then, the negative electrode 11 on which the adhesive material has been formed and the separator 21 which is fed out from the first separator roll 20 are bonded together by the press rollers 2.

Note that an adhesive material may be formed on at least one bonding surface of the negative electrode 11 and the separator 21. In other words, the adhesive material may be formed only on the bonding surface of the negative electrode 11 in the manner described above, the adhesive material may be formed only on the bonding surface of the separator 21, or the adhesive material may be formed on the bonding surfaces of both the negative electrode 11 and the separator 21. Here, in the case where the adhesive material is formed on the bonding surface of the separator 21, the separator 21 is conveyed from the first separator roll 20 via the conveyance roller 1, and the coating material 61 is applied from the applicator 60B to the bonding surface of the first separator roll 20 so that an oblique stripe application pattern as illustrated in FIG. 2, for example, is formed (application step). The displacement of the bonding surface of the separator 21 on which the coating material 61 has been applied is then measured by the laser displacement gauge 70B to identify the number of application defect sites on the bonding surface measured (inspection step). The heating is then carried out by a heat roller which is the conveyance roller 1 serving as a heat roller disposed between the laser displacement gauge 70B and the press rollers 2, whereby an adhesive material is formed on the bonding surface of the separator 21 (drying step).

Further, in the manufacturing apparatus 100, the coating material 61 is fed from the applicator 60C to the surface of the negative electrode 11 side of the laminate of the negative electrode 11 and the separator 21 which have been bonded together with the adhesive material so that an oblique stripe application pattern as illu strated in FIG. 2, for example, is formed. Then, the displacement of the bonding surface of the negative electrode 11 to which the coating material 61 has been applied is measured by the laser displacement gauge 70C to identify the number of application defect sites on the bonding surface (inspection step). Then, the laminate that has undergone the inspection by the laser displacement gauge 70C is heated by a heat roller using the conveyance roller 1 serving as the heat roller disposed between the laser displacement gauge 70C and the press rollers 2. The coating material 61 is dried by this heating, whereby an adhesive material is formed on the bonding surface of the negative electrode 11 in the laminate (drying step) Then, the laminate including the negative electrode 11 on which the adhesive material has been formed and the separator 31 fed out from the second separator roll 30 are bonded together by the press rollers 2.

Note that the adhesive material may be formed on at least one bonding surface of the negative electrode 11 and the separator 31 which constitute the laminate. In other words, the adhesive material may be formed only on the bonding surface of the negative electrode 11 in the manner described above, the adhesive material may be formed only on the bonding surface of the separator 31, or the adhesive material may be formed on the bonding surface of both the negative electrode 11 and the separator 31. Here, in the case where the adhesive material is formed on the bonding surface of the separator 31, the separator 31 is conveyed from the second separator roll 30 via the conveyance roller 1, and the coating material 61 is fed from the applicator 60D to the bonding surface of the separator 31 so that an oblique stripe application pattern as illustrated in FIG. 2, for example, is formed (application step). The displacement of the bonding surface of the separator 31 to which coating material 61 has been applied is then measured by the laser displacement gauge 70D to identify the number of application defect sites on the bonding surface (inspection step). The heating is then carried out by a heat roller which is the heat roller conveyance roller 1 serving as the heat roller disposed between the laser displacement gauge 70D and the press rollers 2, whereby a adhesive material is formed on the bonding surface of the separator 31 (drying step).

Further, in the manufacturing machine 100, the coating material 61 is fed from the applicator 60E to the separator 31 side surface of the laminate of the negative electrode 11 and the separators 21 and 31 bonded with the adhesive material so that an oblique stripe application pattern similar to the one illustrated in FIG. 2 is formed, for example. Then, the displacement of the bonding surface of the separator 31 to which the coating material 61 has been applied is measured by the laser displacement gauge 70E to identify the number of application defect sites on the bonding surface. Then, the laminate that has undergone the inspection by the laser displacement gauge 70E is heated by a heat roller using the conveyance roller 1 serving as the heat roller disposed between the laser displacement gauge 70E and the press rollers 2. The coating material 61 is dried by this heating, whereby an adhesive material is formed on the bonding surface on the separator 31 in the laminate (drying step). Then, the laminate including the separator 31 on which the adhesive material has been formed and a positive electrode 41 fed from the positive electrode stocker 40 are bonded together by the press rollers 2.

In addition, in the manufacturing apparatus 100, the coating material 61 is fed by the applicator 60F to the positive electrode side surface of the secondary battery laminate 200 formed by laminating "positive electrode/ separator/negative electrode/separator" in this order from the top to the bottom so that an application pattern in the same oblique stripe shape as illustrated in FIG. 2, for example, is formed. After an inspection by the laser displacement gauge 70F is then performed and drying is carried out by using the conveyance roller 1 serving as a heat roller as necessary, the secondary battery laminate 200 is cut by the cutter 50.

Note that laminates obtained by cutting the secondary battery laminate 200 by the cutter 50 are further stacked for use in manufacturing of a secondary battery.

(Manufacturing Method of Secondary Battery)

The method of manufacturing a secondary battery of the present disclosure includes a step of manufacturing a secondary battery laminate using the method of manufacturing a secondary battery laminate of the present disclosure described above, and a step of assembling a secondary battery using the secondary battery laminate and an electrolyte solution.

When the method of manufacturing a secondary battery of the present disclosure is used, the occurrence ratio of bonding defects of the electrode and the separator is reduced in production of the laminate, so that secondary batteries having excellent battery characteristics can be efficiently manufactured.

<Assembly Step>

Here, the electrolyte solution can be normally an organic electrolyte solution obtained by dissolving a supporting electrolyte into an organic solvent. For example, when the secondary battery is a lithium ion secondary battery, a lithium salt is used as the supporting electrolyte. Examples of lithium salts include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable in that they easily dissolve in solvent and exhibit a high degree of dissociation, with $LiPF_6$ being particularly preferable. Electrolytes may be used alone or in combination at any ratio. Use of a supporting electrolyte having a high degree of dissociation usually tends to lead to an increase in lithium ion conductivity. Accordingly, lithium ion conductivity can be adjusted through the type of supporting electrolyte that is used.

Any organic solvent that can dissolve the supporting electrolyte can be used as the organic solvent in the electrolyte solution. Preferred examples include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferred for their high dielectric constant and broad stable potential region. Normally, as the viscosity of the solvent being used is lower, the lithium ion conductivity tends to increase. Hence, the lithium ion conductivity can be adjusted by the type of solvent.

Note that the concentration of the electrolyte in the electrolyte solution may be adjusted as appropriate. Furthermore, known additives may be added to the electrolyte solution.

A secondary battery can be assembled by further laminating an additional battery member (electrode and/or separator, etc.), as necessary, to the secondary battery laminate manufactured according to the method of manufacturing a secondary battery laminate of the present disclosure, followed by optionally rolling, folding, or otherwise processing the resultant laminate according to the battery shape, placing the laminate in a battery container, injecting an electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. Further, the secondary battery may take any shape, for example, may be shaped like a coin, a button, a sheet, a cylinder, a square, or a plane.

EXAMPLES

The present disclosure will now be described below based on examples. However, present disclosure is not limited to the examples disclosed herein. In the following, "%" and "parts" used in expressing quantities are by mass, unless otherwise indicated.

Example 1

<Preparation of First Binder>

A reactor equipped with an agitator was charged with 100 parts of deionized water and 0.3 parts of ammonium persulfate. The gas phase was replaced with nitrogen gas, and the temperature was raised to 80° C. In another vessel, 40 parts of deionized water, 0.2 parts of sodium dodecylbenzenesulfonate as an emulsifier, 40.3 parts of styrene as an aromatic monovinyl monomer, 27.3 parts of 2-ethylhexyl acrylate as a monofunctional (meth)acrylic ester monomer, 2.1 parts of methacrylic acid as an acidic group-containing monomer, and 0.3 parts of ethylene glycol dimethacrylate as a crosslinkable monomer were mixed to obtain a monomer composition for forming a core. The monomer mixture for forming the core was continuously added to the reactor over 3 hours to effect polymerization at 80° C. Polymerization was continued until the polymerization conversion rate reached 95%, whereby a water dispersion containing a particulate polymer for forming the core was obtained. Then, a monomer composition for forming a shell containing 29.7 parts of styrene as an aromatic monovinyl monomer and 0.3 parts of methacrylic acid as an acidic group-containing monomer was continuously fed into this water dispersion over 60 minutes, whereby polymerization was continued. The reaction was terminated by cooling when the polymerization conversion reached 98% to thereby prepare an water dispersion of a first binder (a particulate polymer having a core-shell structure, volume average particle diameter: 0.7 μm).

<Preparation of Second Binder>

A reactor equipped with an agitator was charged with 90 parts of deionized water and 0.5 parts of ammonium perfluoroate. The gas phase was replaced with nitrogen gas, and the temperature was raised to 80° C. In another vessel, 15 parts of deionized water, 1.0 parts of NEOPEREX G15 (manufactured by Kao Chemicals) as an emulsifier, and 70.0 parts of 2-ethylhexylacrylate as a monofunctional (meth) acrylic ester monomer, 25.0 parts of styrene as an aromatic monovinyl monomer, 1.7 parts of allyl glycidyl ether, 0.3 parts of allyl methacrylate as a crosslinkable monomer, and 3.0 parts of acrylic acid as an acidic group-containing monomer were mixed to obtain a monomer composition. The monomer composition was continuously added to the reactor over 4 hours to effect polymerization. During continuous addition, the temperature was maintained at 80° C. to effect the reaction. Once the continuous addition was completed, further stirring was performed for 3 hours at a temperature of 80° C. and the reaction was terminated. After the obtained water dispersion was cooled to a temperature of 25° C., a water solution of sodium hydroxide was added to adjust the pH to 8.0. Thereafter, steam was introduced to remove unreacted monomers, thereby preparing an water dispersion of a second binder (a particulate polymer without no core shell structure, volume average particle diameter: 0.2 μm)

<Production of Coating Material>

The water dispersion of the first binder and the water dispersion of the second binder were mixed so that the mass ratio of the solid contents of the first binder:the second binder was 100:10. Deionized water was then further added to dilute the mixture so that the solid content concentration was 10.5% The solid content concentration was adjusted to 10% by further adding propylene glycol to the obtained mixture to obtain a coating material.

<Preparation of Separator>

As an material to be applied, a separator made of polypropylene (PP) (product name "Celgard 2500", surface roughness Sa: 0.1 μm) was used.

<Application, Inspection, and Drying>

While the separator was fed out from the separator web at a speed of 10 m/minute, the coating material was applied to one surface of the separator from an ink jet head of an ink jet type applicator ("KM1024 (shear mode type)", manufactured by Konica). The application was performed so as to form a pattern in which dots of the coating material (diameter: 5 μm) were disposed spaced apart from each other at a center-to-center distance of 500 μm.

Then, while the separator was being conveyed, the displacement of the surface (bonding surface) to which the coating material had been applied was measured by a laser displacement gauge ("LJ-V7060", Keyence Corporation) to identify the number of application defect sites on the separator of 10 m in length (the number of sites where the coating material in the desired dot pattern was absent). Note that the average height of the coating material from the bonding surface was calculated from a measurement result by the laser displacement gauge. The result is summarized in Table 1.

Further, after the above inspection, the coating material on the separator was dried by using a part of the conveyance rollers as a heat roller (drying temperature: 70° C., drying time: 1 second), whereby an adhesive material was formed on the separator. The average diameter of the dot-shaped adhesive material was calculated from results of measurements by a laser microscopy ("VR-3100", manufactured by Keyence Corporation). The result is summarized in Table 1.

<Evaluation of Accuracy of Identification of Application Defect Sites>

From the above separator on which the adhesive material had been formed on one surface, a sample of 100 m length was cut out. The surface of the cut separator on which the adhesive material had been formed was observed under the laser microscopy ("VR-3100", manufactured by Keyence Corporation) to identify the number of application defect sites on the 100-m separator sample.

Then, the difference between the number of application defect sites (N1) identified by the laser microscope after drying and the number of application defect sites (N2) identified by the laser displacement gauge before drying, i.e., the difference (N1–N2) between the identified number of application defect sites was calculated and evaluated according to the following criteria. The result is summarized in Table 1. It can be considered that a smaller difference in the identified number of application defect sites indicates a higher accuracy of identification of application defect sites on the surface of the separator during conveyance.

A: the difference between the identified numbers of application defect sites was less than 10

B: the difference between the identified numbers of application defect sites was 10 or more and less than 50

C: the difference between the identified numbers of application defect sites was 50 or more and less than 300

D: the difference between the identified numbers of application defect sites was 300 or more Examples 2 to 4

A coating material and a separator were prepared in the same manner as in Example 1. Coating, inspection and drying were then performed, and the accuracy of identification of application defect sites was evaluated in the same procedure as in Example 1 except that the diameter of dots of the coating material applied on the separator was changed to 40 μm (Example 2), 100 μm (Example 3), or 250 μm (Example 4). The results are summarized in Table 1.

Examples 5 to 8

A coating material was prepared in the same way as in Example 1. Coating, inspection and drying were then performed in the same manner as in Examples 1 to 4, and the accuracy of identification of application defect sites was evaluated except that a negative electrode prepared as described below was used as the material to be applied instead of the separator. The results are summarized in Table 1. Note that the application was performed on the surface of the negative electrode mixed material layer of the negative electrode.

<Production of Negative Electrode>

A 5-MPa pressure vessel equipped with a stirrer was charged with 33 parts of 1,3-butadiene, 3.5 parts of itaconic acid, 63.5 parts of styrene, 0.4 parts of sodium dodecylben-zenesulfonate as an emulsifier, 150 parts of deionized water, and 0.5 parts of potassium persulfate as a polymerization initiator. The contents of the pressure vessel were sufficiently stirred and were then heated to a temperature of 50° C. to initiate polymerization. Once the polymerization conversion rate reached 96%, the reaction was stopped by cooling to yield a mixture containing a binder for a negative electrode mixed material layer (SBR). The mixture containing the binder for a negative electrode mixed material layer was adjusted to pH 8 through addition of 5% sodium hydroxide aqueous solution. Thereafter, unreacted monomers were removed from the mixture by heated vacuum distillation. Thereafter, the mixture was cooled to a temperature of 30° C. or lower to obtain an water dispersion containing the target binder for a negative electrode mixed material layer.

Next, 100 parts of synthetic graphite (average volume particle diameter: 15.6 μm) as a negative electrode active material, 1 part in solid content equivalent of a 2% water solution of sodium salt of carboxymethyl cellulose (product name "MAC350HC" from Nippon Paper Industries Co., Ltd.) as a viscosity modifier, and deionized water were mixed and adjusted to a solid content concentration of 68%, and further mixed for 60 minutes at a temperature of 25° C. The solid content concentration was then adjusted to 62% with deionized water and a further 15 minutes of mixing was carried out at a temperature of 25° C. Next, 1.5 parts in solid equivalents of the above-mentioned binder for a negative electrode mixed material layer and deionized water were added to the resultant mixed solution, the final solid content concentration was adjusted to 52%, and mixing was performed for a further 10 minutes. The resultant mixture was subjected to defoaming treatment under reduced pressure to afford a slurry composition for secondary battery negative electrode with good fluidity.

The obtained slurry composition for a secondary battery negative electrode was applied onto both surfaces of copper foil of 20 μm in thickness used as a current collector using a comma applicator so as to have a film thickness after drying of approximately 150 μm, and was dried. This drying was performed by conveying the copper foil through an oven at a temperature of 60° C. at a rate of 0.5 m/min over 2 minutes. Thereafter, heat treatment was performed for 2 minutes at a temperature of 120° C. to obtain a pre-pressing negative electrode web. The pre-pressing negative electrode web was rolled by a roll press to obtain a negative electrode (thickness of the negative electrode mixed material layer: 80 μm, surface roughness of the negative electrode mixed material layer Sa: 0.3 μm).

Examples 9 to 12

A coating material and a separator were prepared in the same manner as in Example 1. The coating material was then applied on a separator using a gravure roll having a gravure plate for providing a desired dot shape and a gravure printing machine in place of the ink jet type applicator. The diameter of the dots was 20 μm (Example 9), 40 μm (Example 10), 100 μm (Example 11), or 250 μm (Example 12). The inspection and drying were carried out and the accuracy of identification of application defect sites was evaluated in the same procedure as in Example 1. The results are summarized in Table 1.

Comparative Examples 1 to 8

The procedure was carried out and the accuracy of identification of application defect sites was evaluated in the same manner as in Examples 1 to 8 except that the inspection was carried out after drying (i.e., the "number of application defect sites (N2)" was identified not before drying but after drying by examining the bonding surface with the laser displacement gauge). The results are summarized in Table 1.

Comparative Examples 9 to 10

The procedure was carried out and the accuracy of identification of application defect sites was evaluated in the same manner as in Comparative Examples 1 to 4 except that a CCD camera was used as an inspection apparatus in place of the laser displacement gauge during the inspection. The results are summarized in Table 1.

TABLE 1

| | | Application | | | Inspection | | Drying | Evaluation of |
| | Applicator | Application Method | Solid content concentration of coating material [% by mass] | Average height of coating material [μm] | Apparatus | Timing | Average diameter of adhesive material [μm] | accuracy |
|---|---|---|---|---|---|---|---|---|
| Example 1 | Separator | Ink jetting | 10 | 2 | Laser displacement gauge | Before drying | 5 | A |
| Example 2 | | | 10 | 20 | | | 40 | A |
| Example 3 | | | 10 | 50 | | | 100 | A |
| Example 4 | | | 10 | 125 | | | 250 | A |
| Example 5 | Negative electrode | | 10 | 2 | | | 5 | A |
| Example 6 | | | 10 | 20 | | | 40 | A |

TABLE 1-continued

| | | Application | | | Inspection | | Drying | |
| | Applicator | Method | Solid content concentration of coating material [% by mass] | Average height of coating material [μm] | Apparatus | Timing | Average diameter of adhesive material [μm] | Evaluation of accuracy |
|---|---|---|---|---|---|---|---|---|
| Example 7 | | | 10 | 50 | | | 100 | A |
| Example 8 | | | 10 | 125 | | | 250 | A |
| Example 9 | Separator | Gravure | 10 | 10 | | | 20 | A |
| Example 10 | | printing | 10 | 20 | | | 40 | A |
| Example 11 | | | 10 | 50 | | | 100 | A |
| Example 12 | | | 10 | 125 | | | 250 | A |
| Comp. Ex. 1 | Separator | Ink | 10 | 2 | Laser | After | 5 | D |
| Comp. Ex. 2 | | jetting | 10 | 20 | displacement | drying | 40 | D |
| Comp. Ex. 3 | | | 10 | 50 | gauge | | 100 | D |
| Comp. Ex. 4 | | | 10 | 125 | | | 250 | B |
| Comp. Ex. 5 | Negative | | 10 | 2 | | | 5 | D |
| Comp. Ex. 6 | electrode | | 10 | 20 | | | 40 | D |
| Comp. Ex. 7 | | | 10 | 50 | | | 100 | C |
| Comp. Ex. 8 | | | 10 | 125 | | | 250 | C |
| Comp. Ex. 9 | Separator | | 10 | 2 | CCD | | 5 | D |
| Comp. Ex. 10 | | | 10 | 20 | Camera | | 40 | D |
| Comp. Ex. 11 | | | 10 | 50 | | | 100 | D |
| Comp. Ex. 12 | | | 10 | 125 | | | 250 | D |

It can be seen from Table 1 that application defect sites on the separator or the electrode could be determined with a high accuracy in Examples 1 to 12. By using such an inspection technique, the ratio of occurrences of bonding defects of the electrode and the separator can be reduced and laminates can be efficiently produced.

On the other hand, it can be seen from Table 1 that highly accurate identifications of application defect sites on the separator or electrode were not achieved in Comparative Examples 1 to 12.

INDUSTRIAL APPLICABILITY

According to the inspection method of the present disclosure, application defect sites can be identified with a high accuracy when manufacturing a secondary battery laminate in which the battery members are bonded together via an adhesive material.

Further, according to the manufacturing method of a secondary battery laminate of the present disclosure, the occurrence ratio of bonding defects of the electrode and the separator can be reduced and a secondary battery laminate can be efficiently manufactured.

Further, according to the method of manufacturing a secondary battery of the present disclosure, secondary batteries having excellent battery characteristics can be efficiently manufactured.

REFERENCE SIGNS LIST

1 Conveyance roller
2 Press roller
10 Negative electrode roll
11 Negative electrode
20 First separator roll
30 Second separator roll
21, 31 Separator
40 Positive electrode stocker
41 Positive electrode
50 Cutter
60A, 60B, 60C, 60D, 60E, 60F Applicator
61 Coating material 70A, 70B, 70C, 70D, 70E Laser displacement gauge
100 Manufacturing apparatus
200 Secondary battery laminate
T Conveyance direction

The invention claimed is:

1. An inspection method used when forming an adhesive material to a bonding surface of an electrode that is located opposite to a current collector through the steps of applying a coating material containing a binder and a solvent to the bonding surface; and forming the adhesive material by drying the coating material which has been applied to the bonding surface, the method comprising the step of:
   prior to the step of forming the adhesive material, measuring a displacement of the bonding surface to which the coating material has been applied with a laser displacement gauge to identify an application defect site,
   wherein the bonding surface is for bonding the electrode and a separator,
   wherein the electrode is made of an electrode substrate including an electrode mixed material layer formed and dried on one side or both sides of the current collector, the bonding surface is a surface of either:
   (A) the electrode mixed material layer, or
   (B) a porous membrane layer formed on the electrode mixed material layer.

2. The inspection method according to claim 1, wherein an average height of the coating material from the bonding surface in the step of applying the coating material is 2 mm or more and 150 mm or less.

3. The inspection method according to claim 1, wherein the adhesive material is formed into a dot shape, and an average diameter of the dot-shaped adhesive material is 5 mm or more and 300 mm or less, in the step of forming the adhesive material.

4. The inspection method according to claim 1, wherein a solid content concentration of the coating material is 20% by mass or less in the step of applying the coating material.

5. The inspection method according to claim 1, wherein the step of applying the coating material is performed by ink jetting in the step of applying the coating material.

6. A method of manufacturing a secondary battery laminate, the method comprising the steps of:

conducting an inspection in accordance with the inspection method according to claim 1; and after conducting the inspection, bonding the electrode and the separator together via the bonding surface of the electrode on which the adhesive material has been formed.

7. A method of manufacturing a secondary battery comprising a secondary battery laminate, the method comprising the steps of:

manufacturing the secondary battery laminate using the method of manufacturing a secondary battery laminate according to claim 6; and assembling the secondary battery using the secondary battery laminate and an electrolyte solution.

8. The inspection method according to claim 1, wherein the coating material has a viscosity of 1 mPa·s or more and 50 mPa·s or less.

9. The inspection method according to claim 1, wherein a surface roughness of the bonding surface is 0.2 μm or more and 1.0 μm or less.

10. An inspection method used when forming an adhesive material to a bonding surface of a separator through the steps of applying a coating material containing a binder and a solvent to the bonding surface; and forming the adhesive material by drying the coating material which has been applied to the bonding surface, the method comprising the step of:

prior to the step of forming the adhesive material, measuring a displacement of the bonding surface to which the coating material has been applied with a laser displacement gauge to identify an application defect site, and wherein the bonding surface is for bonding an electrode and the separator.

11. The inspection method according to claim 10, wherein an average height of the coating material from the bonding surface in the step of applying the coating material is 2 μm or more and 150 μm or less.

12. The inspection method according to claim 10, wherein the adhesive material is formed into a dot shape, and an average diameter of the dot-shaped adhesive material is 5 μm or more and 300 μm or less, in the step of forming the adhesive material.

13. The inspection method according to claim 10, wherein a solid content concentration of the coating material is 20% by mass or less in the step of applying the coating material.

14. The inspection method according to claim 10, wherein the step of applying the coating material is performed by ink jetting in the step of applying the coating material.

15. A method of manufacturing a secondary battery laminate, the method comprising the steps of:

conducting an inspection in accordance with the inspection method according to claim 10; and after conducting the inspection, bonding the electrode and the separator together via the bonding surface of the separator on which the adhesive material has been formed.

16. A method of manufacturing a secondary battery comprising a secondary battery laminate, the method comprising the steps of:

manufacturing the secondary battery laminate using the method of manufacturing a secondary battery laminate according to claim 15; and assembling the secondary battery using the secondary battery laminate and an electrolyte solution.

17. The inspection method according to claim 10, wherein the coating material has a viscosity of 1 mPa·s or more and 50 mPa·s or less.

18. The inspection method according to claim 10, wherein a surface roughness of the bonding surface is 0.2 μm or more and 1.0 μm or less.

*    *    *    *    *